United States Patent
Reichert

(10) Patent No.: US 10,213,885 B2
(45) Date of Patent: *Feb. 26, 2019

(54) ELECTROMAGNETIC BASE FOR MAGNETIC DRILL PRESS

(71) Applicant: Milwaukee Electric Tool Corporation, Brookfield, WI (US)

(72) Inventor: Timothy R. Reichert, Franklin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,736

(22) Filed: Aug. 21, 2017

(65) Prior Publication Data
US 2017/0341195 A1    Nov. 30, 2017

Related U.S. Application Data

(63) Continuation of application No. 14/639,559, filed on Mar. 5, 2015, now Pat. No. 9,764,438.

(60) Provisional application No. 61/949,296, filed on Mar. 7, 2014.

(51) Int. Cl.
| | | |
|---|---|---|
| B23Q 3/154 | (2006.01) |
| B23Q 9/00 | (2006.01) |
| H01F 7/20 | (2006.01) |
| B25H 1/00 | (2006.01) |

(52) U.S. Cl.
CPC ......... B23Q 3/1543 (2013.01); B23Q 9/0014 (2013.01); B25H 1/0071 (2013.01); H01F 7/20 (2013.01); Y10T 408/554 (2015.01)

(58) Field of Classification Search
CPC .. B23Q 3/1543; B23Q 9/0014; B25H 1/0071; H01F 7/20; Y10T 408/554
See application file for complete search history.

(56) References Cited

U.S. PATENT DOCUMENTS

| | | |
|---|---|---|
| 1,528,796 A | 3/1925 | Simmons |
| 3,596,558 A | 8/1971 | Rydell |
| 3,796,506 A | 3/1974 | Buck |
| RE30,519 E | 2/1981 | Hougen |
| 4,278,371 A | 7/1981 | Meyer |
| 4,390,309 A | 6/1983 | Fangmann |
| 4,777,768 A | 10/1988 | Audi et al. |

(Continued)

FOREIGN PATENT DOCUMENTS

GB    809246    2/1959

OTHER PUBLICATIONS

Milwaukee, Service Parts List—Mag Stand Assembly, Catalog No. 4270-20, Bulletin No. 54/46/0400, Aug. 2011, (4 pages)

*Primary Examiner* — Eric A Gates
(74) *Attorney, Agent, or Firm* — Michael Best & Friedrich LLP

(57) ABSTRACT

A drill press includes a main housing, a drill unit supported by the main housing for relative movement therewith, and a magnetic base for coupling the drill press to a ferromagnetic workpiece. The magnetic base includes a ferromagnetic body having spaced, substantially parallel first and second rails. Each of the first and second rails includes a flat bottom surface engageable with the ferromagnetic workpiece. A coil is positioned between the first and second rails for generating a holding force on the ferromagnetic workpiece. The coil defines a central axis that is parallel with the bottom surface of each of the first and second rails.

24 Claims, 5 Drawing Sheets

(56) References Cited

U.S. PATENT DOCUMENTS

| | | |
|---|---|---|
| 5,096,339 A | 3/1992 | Shoji |
| 5,275,514 A | 1/1994 | Johnson |
| 5,342,153 A | 8/1994 | Dobkins |
| 6,687,210 B2 | 2/2004 | Yoo et al. |
| 8,376,667 B2 | 2/2013 | Wilbert et al. |
| 2015/0367484 A1 | 12/2015 | Choi |

ELECTROMAGNETIC BASE FOR MAGNETIC DRILL PRESS

CROSS-REFERENCE TO RELATED APPLICATIONS

This application is a continuation of co-pending U.S. patent application Ser. No. 14/639,559 filed Mar. 5, 2015, which claims priority to U.S. Provisional Patent Application No. 61/949,296 filed on Mar. 7, 2014, the entire contents of which are incorporated herein by reference.

FIELD OF THE INVENTION

The present invention relates to electromagnetic bases, and more specifically to electromagnetic bases for use with drill presses.

BACKGROUND OF THE INVENTION

Magnetic drill presses perform drilling operations by magnetically latching a base of the drill press to a ferromagnetic workpiece. The magnetic base of the drill press may be switchable between magnetized and demagnetized states using electromagnets or permanent magnets.

SUMMARY OF THE INVENTION

The invention provides, in one aspect, a drill press including a main housing, a drill unit supported by the main housing for relative movement therewith, and a magnetic base for coupling the drill press to a ferromagnetic workpiece. The magnetic base includes a ferromagnetic body having spaced, substantially parallel first and second rails. Each of the first and second rails includes a flat bottom surface engageable with the ferromagnetic workpiece. A coil is positioned between the first and second rails for generating a holding force on the ferromagnetic workpiece. The coil defines a central axis that is parallel with the bottom surface of each of the first and second rails.

The invention provides, in another aspect, a drill press including a main housing, a drill unit supported by the main housing for relative movement therewith, and a magnetic base for coupling the drill press to a ferromagnetic workpiece. The magnetic base includes a ferromagnetic body having spaced, substantially parallel first and second rails. Each of the first and second rails includes a flat bottom surface engageable with the ferromagnetic workpiece. A coil is positioned between the first and second rails for generating a holding force on the ferromagnetic workpiece. Each of the first and second rails includes a chamfer adjacent the flat bottom surface and on an interior edge of the respective first and second rails.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
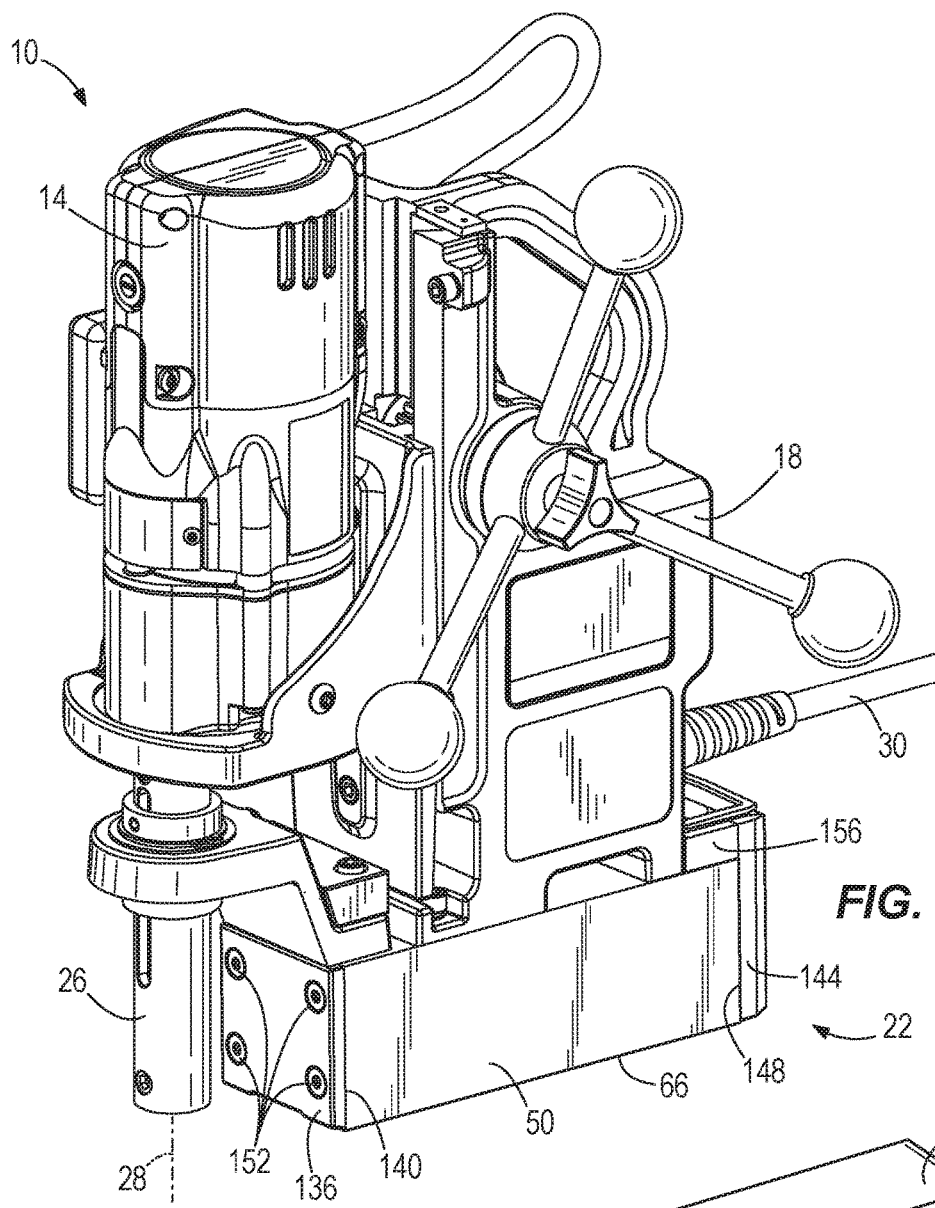
FIG. 1 is a perspective view of a drill press including an electromagnetic base in accordance with an embodiment of the invention.
Figure 7:
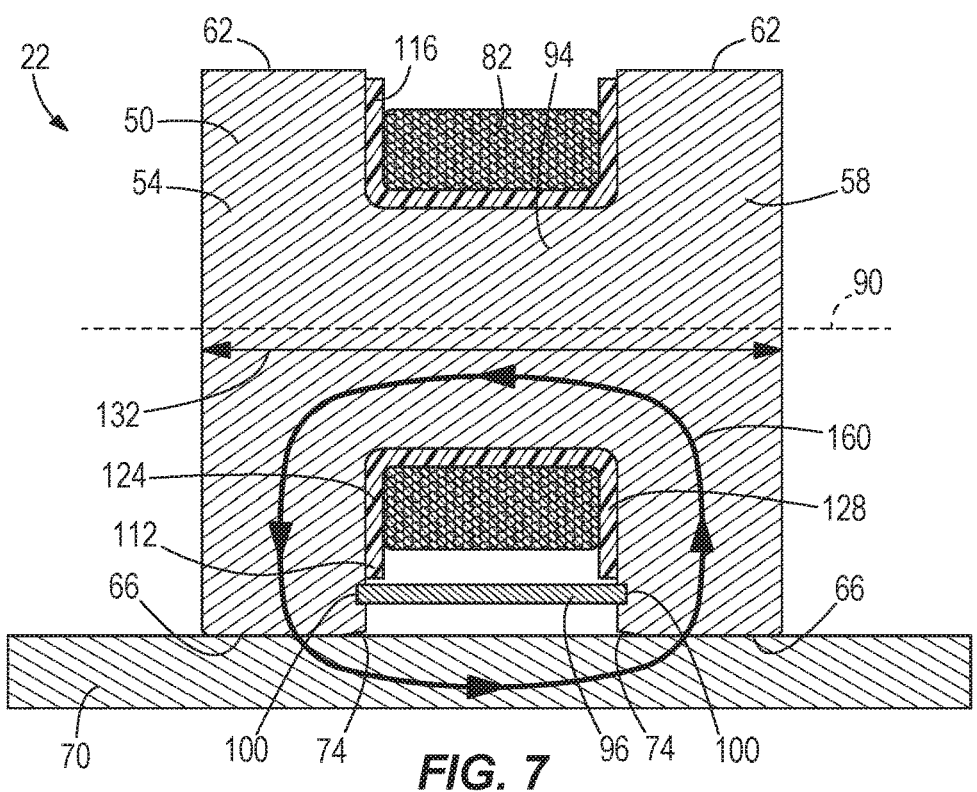
FIG. 7 is a cross-sectional view of the electromagnetic base of FIG. 3 positioned on a flat workpiece, schematically showing a magnetic flux path through the workpiece.
Figure 9:
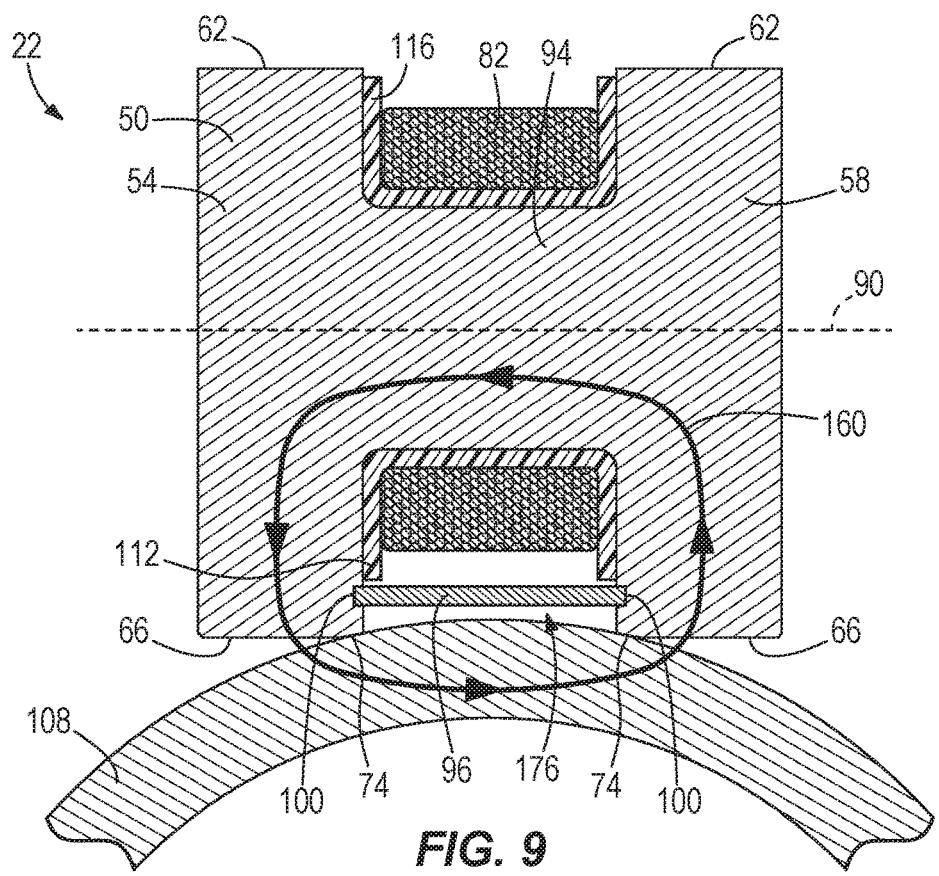
FIG. 9 is a cross-sectional view of the electromagnetic base of FIG. 3 positioned on a cylindrical workpiece, schematically showing a magnetic flux path through the workpiece.

FIG. 1 illustrates a magnetic drill press 10 including a drill unit 14, a main housing 18 to support the drill unit 14, and a magnetic base 22 coupled to the main housing 18 and selectively magnetically latching the magnetic drill press 10 to a ferromagnetic workpiece (FIGS. 7 and 9). The drill unit 14 may include a DC motor or an AC motor to rotate a spindle 26 with a working tool attached thereto about a rotational axis 28. The drill unit 14 is supported by the main housing 18 for relative movement therewith in a direction along the rotational axis 28. The magnetic drill press 10 may be powered by a battery, from an AC voltage input 30 (i.e., from a wall outlet) as shown in the illustrated embodiment, or by an alternative DC voltage input (e.g., a DC power supply).

Figure 2:
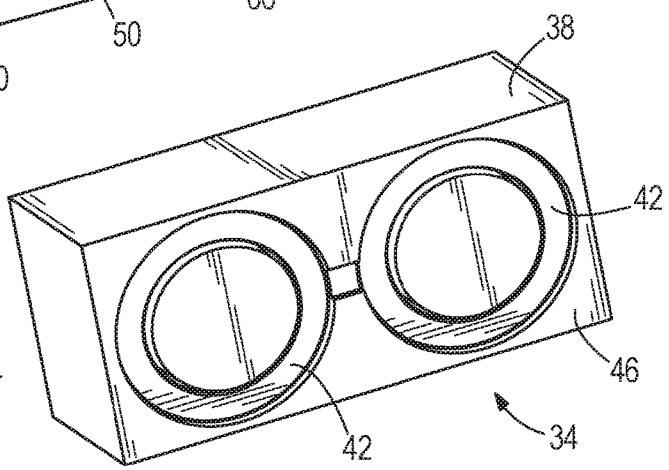
FIG. 2 is a bottom perspective view of a prior art electromagnetic base including two cylindrical coils.
Figure 8:
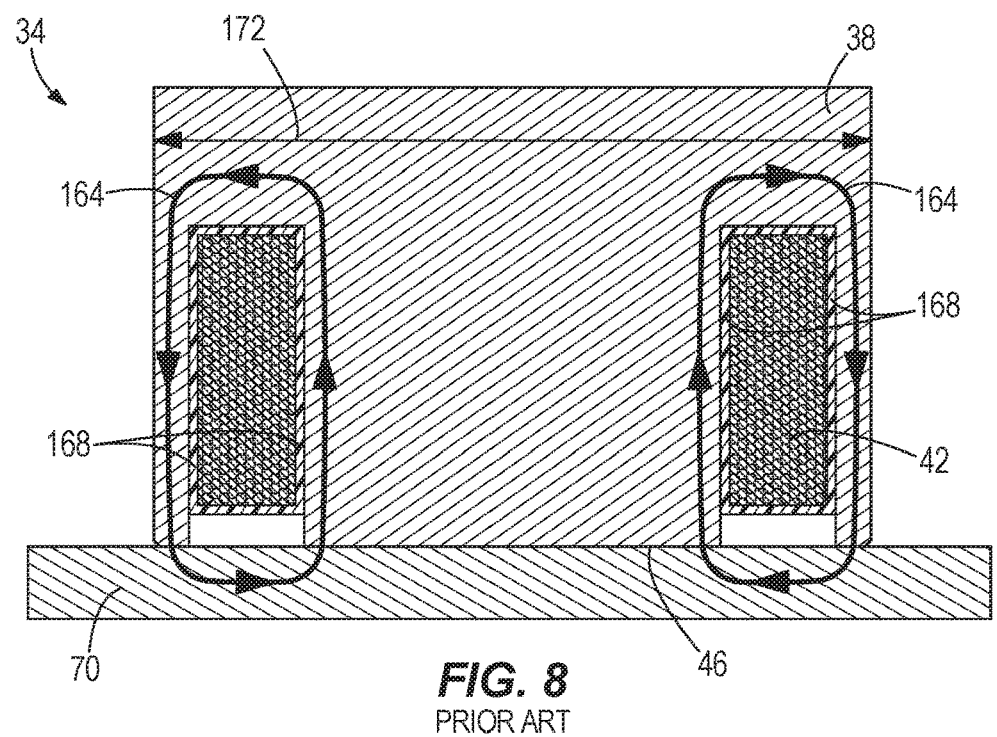
FIG. 8 is a cross-sectional view of the prior art electromagnetic base of FIG. 2 positioned on a flat workpiece, schematically showing multiple magnetic flux paths through the workpiece.

With reference to FIG. 2, a prior art magnetic base 34 for use with a drill press includes a ferromagnetic body 38 and two cylindrical electromagnet coils 42 having respective central axes that are normal to a flat bottom surface 46 of the ferromagnetic body 38. The electromagnet coils 42 are energized by a power source (not shown) to magnetize the ferromagnetic body 38 and attach the bottom surface 46 to a flat workpiece or other ferromagnetic substrate (FIG. 8). The prior art base 34, however, only provides a single line of contact between the flat bottom surface 46 and a cylindrical or convex surface, which prevents the base 34 from sitting stably on a pipe, for example. Furthermore, the base 34 requires ferromagnetic material located above the electromagnet coils 42 to complete the magnetic circuit and generate the flux paths shown in FIG. 8, which adds to the overall weight of the base 34. Finally, the base 34 is not easily scaled in size and fixed dimensional proportions are required to maintain the magnetic properties of the base 34. A more detailed discussion of the deficiencies of the prior art base 34 and comparisons to the magnetic base 22 of the invention is provided throughout this description.

Figure 3:
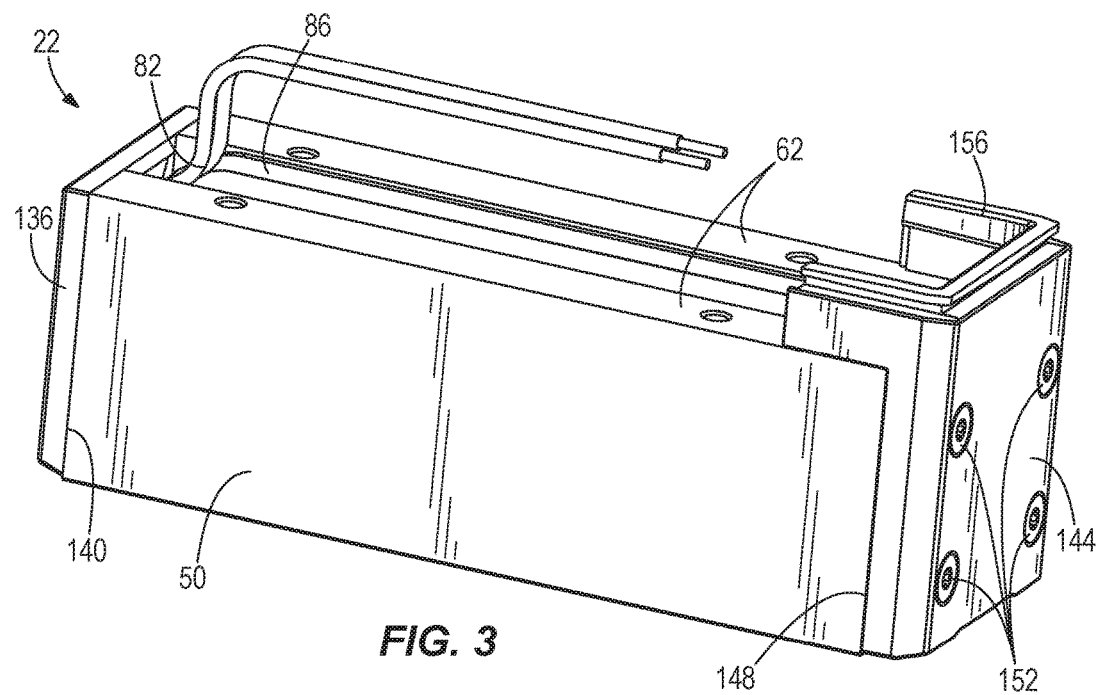
FIG. 3 is a perspective view of the electromagnetic base of FIG. 1.
Figure 4:
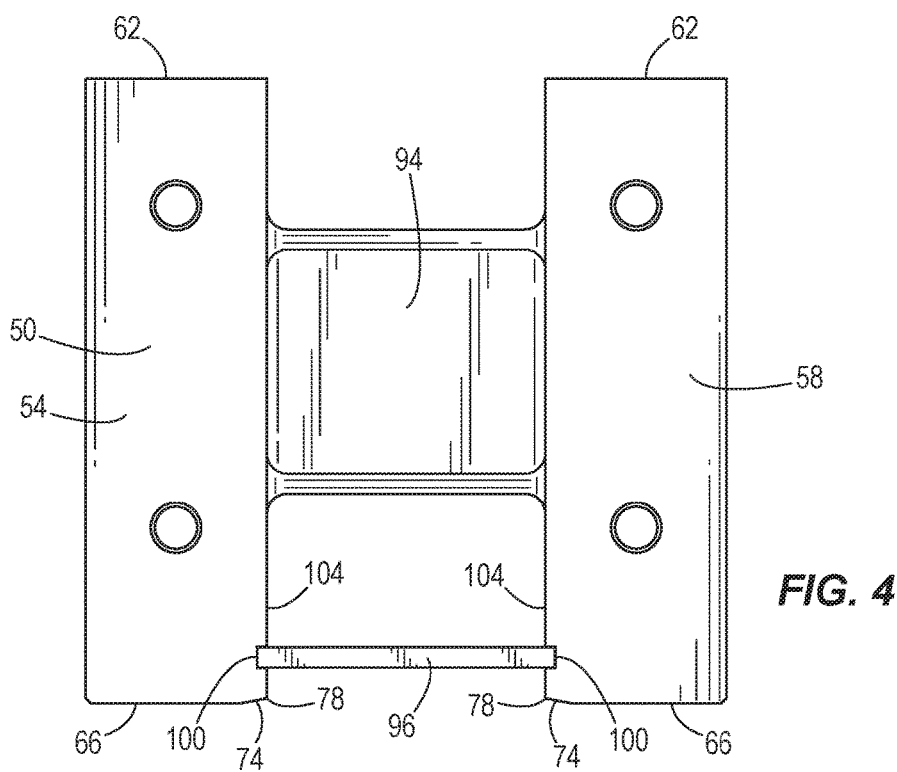
FIG. 4 is an end view of the electromagnetic base of FIG. 3 with the end caps, the bobbin, and the coil removed.
Figure 5:
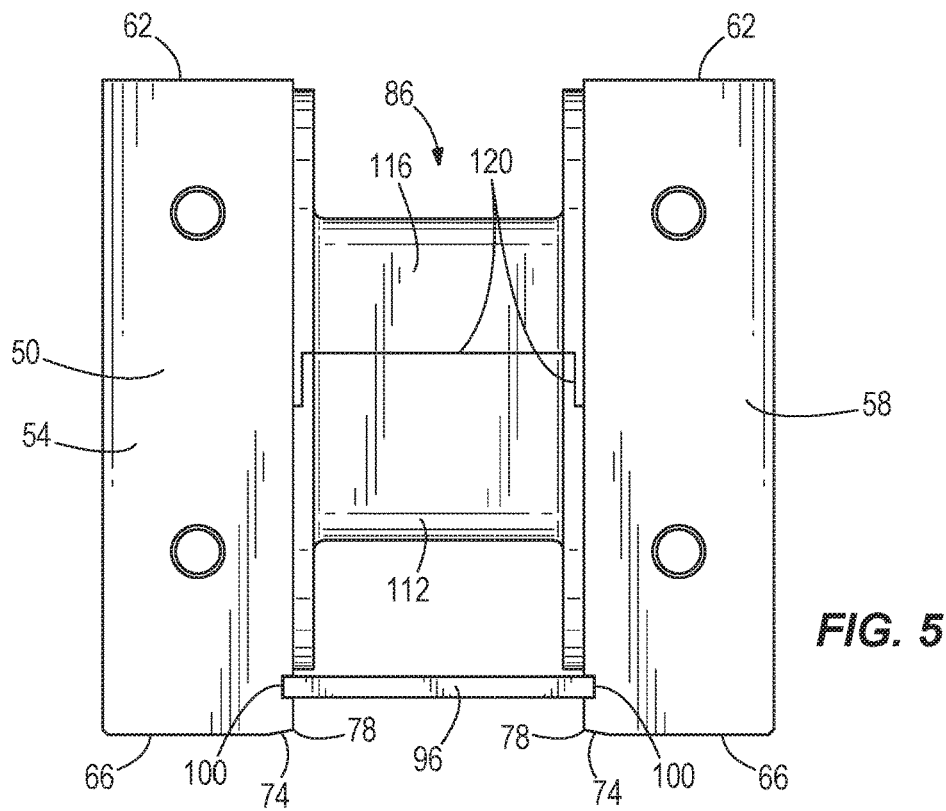
FIG. 5 is an end view of the electromagnetic base of FIG. 3 with the end caps and the coil removed.
Figure 6:
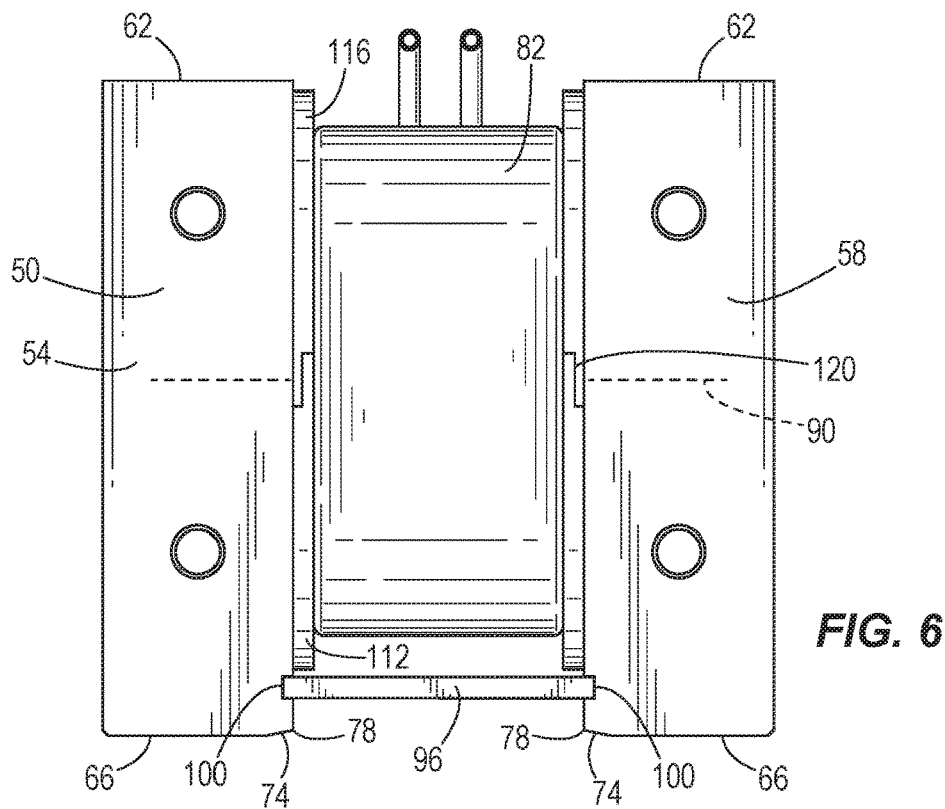
FIG. 6 is an end view of the electromagnetic base of FIG. 3 with the end caps removed.

With reference to the present invention and to FIGS. 3-6, the magnetic base 22 includes a ferromagnetic body 50 having spaced, substantially parallel first and second rails 54, 58 (FIGS. 4-6). Each of the first and second rails 54, 58 includes a top surface 62 and a flat, bottom surface 66 that is engageable with a flat ferromagnetic workpiece 70 (FIG. 7). Each of the first rail 54 and the second rail 58 also includes a chamfer 74 on an interior edge 78 adjacent the bottom surface 66 of the respective rails 54, 58 (FIGS. 4-6). The magnetic base 22 also includes a coil 82 supported on a bobbin 86 and positioned between the first and second rails 54, 58 for generating a holding force on the ferromagnetic workpiece 70 when the coil 82 is energized. The coil 82 is spaced from the flat bottom surface 66 of each of the first and second rails 54, 58, and the coil 82 defines a central axis 90 (FIG. 6) parallel with the bottom surface 66 of each of the first and second rails 54, 58. In other words, when the magnetic base 22 is attached to a flat workpiece 70 to thereby support the drill unit 14 such that the rotational axis 28 is generally perpendicular to the ground, the coil 82 is oriented with the central axis 90 substantially horizontal (FIG. 7). The coil 82 is configured as a bipolar electromagnet and is the only coil 82 incorporated in the base 22 for generating a workpiece-holding force.

Figure 10:
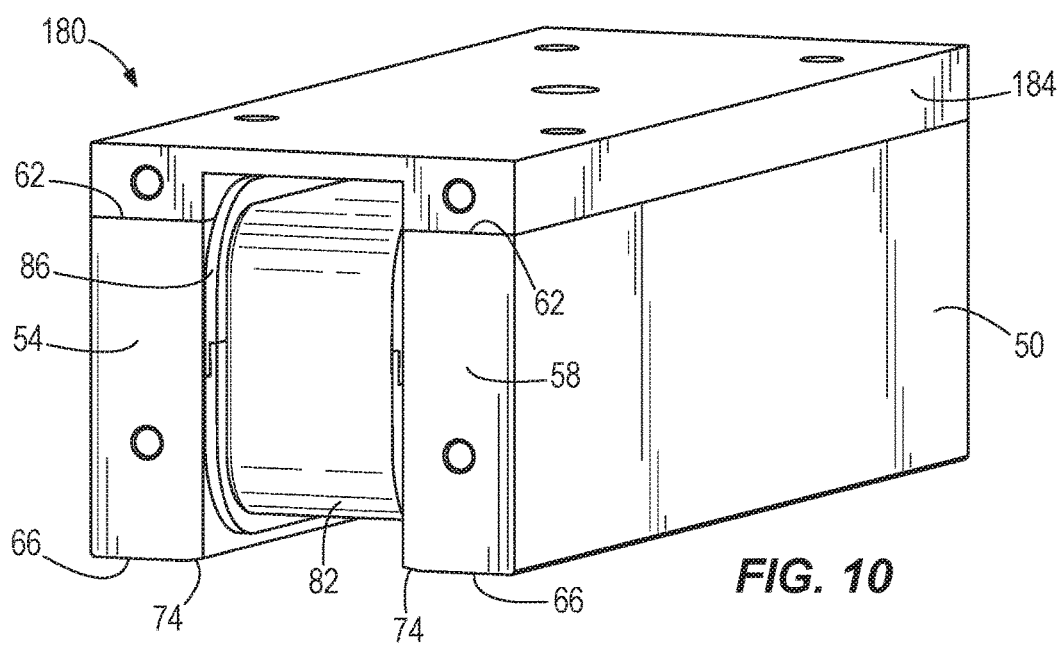
FIG. 10 is a perspective view of an electromagnetic base in accordance with another embodiment of the invention.

With reference to FIG. 4, the ferromagnetic body 50 includes a rib 94 interconnecting the first rail 54 and the second rail 58. The rib 94 interconnects the first rail 54 and the second rail 58 at a position spaced from the flat bottom surface 66 and the top surface 62 of each of the first and second rails 54, 58. In other words, the rib 94 is positioned intermediate the top surface 62 and the bottom surface 66 of the first and second rails 54, 58. Alternatively, the rib 94 may be substantially aligned with the top surface 62 of the respective rails 54, 58 (FIG. 10).

The base 22 further includes a non-ferromagnetic plate 96 extending between the first rail 54 and the second rail 58 (FIG. 4). The non-ferromagnetic plate 96 is positioned beneath and spaced from the coil 82. The non-ferromagnetic plate 96 is also positioned above and spaced from the chamfers 74. A groove 100 is formed in an interior surface 104 of each of the first rail 54 and the second rail 58 such that the non-ferromagnetic plate 96 is slidably received within the respective grooves 100. As explained in further detail below, the non-ferromagnetic plate 96 protects the bottom of the coil 82 from contact with the workpiece or anything else.

With reference to FIG. 9, the chamfer 74 on the each of the first and second rails 54, 58 enables the base 22 to be supported on a convex or cylindrical surface 108 (e.g., a pipe). In some embodiments, the chamfers 74 are inclined relative to the respective bottom surfaces 66 between about 10 degrees and about 12 degrees. Alternatively, the chamfers 74 may be inclined relative to the respective bottom surfaces 66 between about 8 degrees and about 14 degrees. In the illustrated embodiment, the chamfers 74 are inclined relative to the respective bottom surfaces 66 by about 11 degrees and are suitable to support the base 22 on a 6-inch diameter (i.e., schedule 40) pipe. As explained in further detail below, the chamfers 74 modify the magnetic properties of the ferromagnetic body 50, and allow the base 22 to achieve acceptable holding strength on both thick and thin workpieces.

With reference to FIG. 5, the bobbin 86 is shown positioned around the rib 94 with the coil 82 removed. The bobbin 86 includes a first portion 112 and a second portion 116 that are interconnected by an overlapping joint 120. In particular, the overlapping joint 120 is a labyrinth joint that is assembled by snap-fitting the first portion 112 and the second portion 116 together. The overlapping joint 120 prevents any splits within the insulating material between the coil 82 and the ferromagnetic body 50, and increases the dielectric strength of the insulation. With reference to FIG. 7, a first insulation layer 124 (i.e., a flange of the first portion 112) is positioned between the first rail 54 and the coil 82, and a second insulation layer 128 (i.e., an opposite flange of the first portion 112) is positioned between the second rail 58 and the coil 82. In the illustrated embodiment, as a result of orienting the coil 82 with its central axis 90 parallel to the bottom surfaces 66 of the respective rails 54, 58, there are no more than two layers of insulation 124, 128 located within a width dimension 132 defined between the first rail 54 and the second rail 58. In contrast, the prior art base 34 includes four layers of insulation 168 within a width dimension 172 of the prior art base 34. By reducing the number of insulation layers within the width dimension 132, the overall width of the magnetic base 22 is reduced compared to the width of the prior art base 34. Also, by reducing the number of insulation layers within the width dimension 132, a higher coil density (i.e., more power) can be achieved compared to the prior art base 34. In alternative embodiments, dielectric tape or a coil overmold could replace the bobbin 86. As a further alternative, the ferromagnetic body can be cut down the center so the bobbin can remain whole and the coil wound separately before the ferromagnetic body halves are joined back together with the bobbin and wound coil.

With reference to FIG. 3, the magnetic base 22 further includes a first end cap 136 coupled to a front end 140 of the ferromagnetic body 50 and a second end cap 144 coupled to a rear end 148 of the ferromagnetic body 50. The first and second end caps 136, 144 are made from a non-ferromagnetic material (e.g., stainless steel or aluminum). The first and second end caps 136, 144 are secured to the ferromagnetic body 50 via fasteners 152, or the like. The first end cap 136, the second end cap 144, and the non-ferromagnetic plate 96 at least partially enclose the coil 82, thereby protecting it from inadvertent contact with the workpiece or anything else. The second end cap 144 includes a mounting portion 156 that extends above the ferromagnetic body 50 and engages the main housing 18 to secure the base 22 and the main housing 18 together. In this instance, the main housing 18 is coupled to the top surface 62 of each of the first and second rails 54, 58, thereby functioning as a top cap enclosing an upper portion of the coil 82. The first and second rails 54, 58 also extend above and below the coil 82. Accordingly, the main housing 18, the first end cap 136, the second end cap 144, and the non-ferromagnetic plate 96 completely enclose the coil 82.

With reference to FIG. 7, the base 22 is magnetically latched to a top surface of the flat workpiece 70, schematically illustrating a single magnetic flux path 160 passing through a wide portion of the workpiece 70. In contrast, FIG. 8 illustrates the prior art base 34 magnetically latched to a top surface of the flat workpiece 70, schematically illustrating multiple (e.g., two) magnetic flux paths 164 passing through more narrow portions of the workpiece 70. Regarding the prior art base 34 of FIG. 8, the flux paths 164 pass through ferromagnetic material with various cross-sections, and ferromagnetic material is required above the coil 42 to complete the magnetic circuit. In addition, the flat bottom surface 46 across the entire width of the prior art base 34 is required to complete the magnetic circuit through the flat workpiece 70. In contrast, with the base 22 of FIG. 7, the flux path 160 travels through ferromagnetic material with a substantially uniform cross-section from one side of the base 22 to the other because the rails 54, 58 and the rib 94 have similar cross-sectional areas.

The magnetic base 22 is an improvement over the prior art base 34 because the dimensions of the magnetic base 22 can be reduced more easily to reduce the overall width of the drill press 10 in which the base 22 is used. Reducing the width of the drill press 10 is desirable in many applications. For example, the magnetic base 22 allows a user to drill in hard to reach places such as the inside of an I-beam, in which width is limited but the height and length of the drill press are not as restrictive. The magnetic base 22 can be modified to increase the overall length of the base, and such a modification would not affect the length of the magnetic flux path 160. In other words, because the ferromagnetic body 50 is symmetrical, it is more suitable for scaling. In contrast, if the length of the prior art base 34 is increased, the length of the magnetic flux path 164 increases, which increases reluctance and decreases the strength of the magnetic field. Increasing the length of the prior art base 34 also requires a more proportional change in the width of the base 34 because it is important to maintain a uniform cross-section for the magnetic flux path to travel through. As a result, the base 22 can be made longer and narrower than the prior art base 34. Increasing the base length also provides an increased resistance to a reactionary moment (caused by a reaction to the working tool engaging the workpiece) acting to lift the base 22 off the workpiece 70. In this scenario, the drill press 10 will tend to pivot on the rear of the base 22 as the working tool plunges into the workpiece 70. A longer electromagnetic base 22 will better resist this moment compared to the prior art electromagnetic base 34.

The base 22, which includes just a single coil 82, maximizes the magnetic field strength within the ferromagnetic body 50. Another benefit to including only the single coil 82 within the base 22 is that a ferromagnetic body can only dissipate so much heat, which limits the amount of power that can be applied to the coil(s). With a limited power, the total amp-turns of the coil(s) in the electromagnetic base of a given size are similar whether there is one coil or multiple coils. With multiple coils, however, the total amp-turns may be less because coil space must be sacrificed for additional insulation. As described above and with reference to FIGS. 7 and 8, there are only two layers of insulation 124, 128 across the width dimension 132 of base 22 (FIG. 7), whereas the prior art base 34 includes at least four layers of insulation 168 across a width dimension 172 (FIG. 8). Accordingly, the coil density in the base 22 is greater than that in the prior art base 34.

The magnetic drill press 10 is utilized on workpieces having different thickness, and the magnetic base 22 is operable to create adequate holding force for both thick (e.g., ¾" and thicker) and thin (e.g., ⅜" and thinner) workpieces. With only the single coil 82, there is only one flux path 160 through the workpiece. Thin materials can saturate easily, causing the holding force to deteriorate. As explained below, the chamfers 74 allow for tuning of the holding force generated by the coil 82 on different material thicknesses. The holding force is proportional to the cross-sectional area of the magnetic flux path and proportional to the flux density squared. For a thinner workpiece, the magnetic flux is choked off by the high reluctance of a narrow magnetic flux path through the thin workpiece. When the cross-sectional area of the flux path is reduced at the bottom surface 66 (i.e., by including a large chamfer), the reluctance of the flux path through the body 50 is changed very little. However, this reduction in the surface area of the bottom surfaces 66 will increase the flux density at the bottom surfaces 66. The increase in flux density has a greater positive effect on holding force than the negative effect from the decrease in cross-sectional area of the path, because holding force is proportional to the square of flux density. Therefore, a large chamfer increases the holding force on a thinner workpiece. As such, the chamfers 74 are designed to tune the ferromagnetic body 50 in order to achieve an acceptable holding force for both thick and thin workpieces.

The prior art magnetic base 34 (which includes multiple coils) is sufficient for magnetically latching to flat or smooth workpieces, but the holding force capable of being developed by the prior art base 34 is substantially reduced when an air gap is introduced between the base 34 and the workpiece. Such air gaps might result from rust, paint, or imperfections on the surface of the workpiece, thereby deteriorating the holding force which the prior art magnetic base 34 is otherwise capable of creating. This is a result of the holding force being proportional to the square of flux density, which is in turn proportional to amp-turns (of a magnetic coil) divided by the reluctance of the magnetic circuit (assuming a constant cross-sectional area through the flux path). When an air gap is introduced, the reluctance of the magnetic circuit increases and causes the magnetic flux to decrease. Assuming the same total amp-turns, the magnetic flux (and in turn the holding force) decreases more substantially when an air gap is introduced in the prior art base 34 with multiple coils than in the base 22 with the single coil 82, because one of multiple coils in the prior art base 34 represents only a fraction of the total amp-turns. In other words, with a fraction of the total amp-turns in the region of the air gap, the magnetic flux and holding force through this region are more substantially decreased compared to the base 22 with a single coil having the total amp-turns in the region of the air gap. As such, the reluctance added by an air gap more significantly affects an electromagnetic base with multiple coils (such as the prior art base 34) than an electromagnetic base with only a single coil (such as the magnetic base 22).

With reference to FIG. 9, the base 22 is configured to support the drill press 10 on a convex or cylindrical surface 108 (e.g., a pipe). Rather than the first and second rails 54, 58 being in contact with the surface 108, the chamfers 74 engage the workpiece 108, thereby providing at least two regions of contact between the base 22 and the workpiece 108. A workpiece receiving space 176 is defined between the first rail 54, the second rail 58, and the non-ferromagnetic plate 96 in which a portion of the workpiece 108 is received. Unlike the prior art base 34 shown in FIG. 8, the base 22 does not require an adaptor or additional attachments in order to be supported on the cylindrical workpiece 108 (FIG. 9).

With reference to FIG. 10, a magnetic base 180 in accordance with another embodiment of the invention is illustrated including a separately removable top cap 184 positioned above the coil 82 and coupled to a top surface 62 of each of a first and second rails 54, 58. The top cap 184 is made from a non-ferromagnetic material (e.g., aluminum) having a density less than that of the ferromagnetic body 50. Although end caps like those shown in FIG. 3 are not illustrated for clarity, it should be understood that the top cap 184 in association with end caps and a non-ferromagnetic plate (like plate 96) may partially or completely enclose the coil 82.

Various features and advantages of the invention are set forth in the following claims.

What is claimed is:

1. A drill press comprising:
a main housing;
a drill unit supported by the main housing for relative movement therewith; and
a magnetic base coupled to the main housing for coupling the drill press to a ferromagnetic workpiece, the magnetic base including
a ferromagnetic body including spaced, substantially parallel first and second rails, each of the first and second rails having a flat bottom surface engageable with the ferromagnetic workpiece, and
a coil positioned between the first and second rails for generating a holding force on the ferromagnetic workpiece, wherein the coil defines a central axis parallel with the bottom surface of each of the first and second rails.

2. The drill press of claim 1, wherein the ferromagnetic body includes a rib interconnecting the first rail and the second rail, and wherein the coil surrounds the rib.

3. The drill press of claim 2, wherein the rib is located between the bottom surface and a top surface of each of the first rail and the second rail.

4. The drill press of claim 3, wherein each of the first rail and the second rail are ferromagnetic from the top surface to the bottom surface.

5. The drill press of claim 1, wherein each of the first rail and the second rail includes a chamfer on an interior edge adjacent the bottom surface of each of the first and second rails.

6. The drill press of claim 1, further comprising a non-ferromagnetic plate extending between the first rail and the second rail, wherein the non-ferromagnetic plate is positioned beneath and spaced from the coil.

7. The drill press of claim 6, further comprising:
a first end cap coupled to a front end of the ferromagnetic body; and
a second end cap coupled to a rear end of the ferromagnetic body, wherein the first and second end caps are made from a non-ferromagnetic material, and wherein the first end cap, the second end cap, and the non-ferromagnetic plate at least partially enclose the coil.

8. The drill press of claim 6, further comprising a groove formed in an interior surface of each of the first rail and the second rail, wherein the non-ferromagnetic plate is received within the groove of each of the first rail and the second rail.

9. The drill press of claim 6, wherein a workpiece receiving space is defined between the first rail, the second rail, and the non-ferromagnetic plate.

10. The drill press of claim 1, further comprising a bobbin upon which the coil is supported, wherein the bobbin includes a first portion and a second portion that are interconnected by an overlapping joint.

11. The drill press of claim 1, further comprising a first insulation layer positioned between the first rail and the coil, and a second insulation layer positioned between the second rail and the coil, wherein a width dimension is defined between the first rail and the second rail, and wherein no more than two layers of insulation are located within the width dimension.

12. The drill press of claim 1, further comprising a top cap positioned above the coil and coupled to a top surface of each of the first and second rails, wherein the top cap is made from a non-ferromagnetic material, and wherein the top cap encloses an upper portion of the coil.

13. The drill press of claim 1, wherein the coil is a bipolar electromagnet.

14. The drill press of claim 1, wherein the coil is spaced from the flat bottom surface of each of the first and second rails.

15. The drill press of claim 1, wherein the coil is the only coil coupled to the ferromagnetic body.

16. The drill press of claim 1, wherein the ferromagnetic body is H-shaped.

17. A drill press comprising:
a main housing;
a drill unit supported by the main housing for relative movement therewith; and
a magnetic base for coupling the drill press to a ferromagnetic workpiece, the magnetic base including
a ferromagnetic body including spaced, substantially parallel first and second rails, each of the first and second rails having a flat bottom surface engageable with the ferromagnetic workpiece, and
a coil positioned between the first and second rails for generating a holding force on the ferromagnetic workpiece, wherein each of the first and second rails includes a chamfer adjacent the flat bottom surface and on an interior edge of the respective first and second rails.

18. The drill press of claim 17, wherein the chamfer is inclined between 10 degrees and 12 degrees relative to the flat bottom surface.

19. The drill press of claim 17, further comprising a non-ferromagnetic plate extending between the first rail and the second rail, wherein the non-ferromagnetic plate is positioned between the coil and the chamfer of each of the first and second rails.

20. The drill press of claim 19, wherein a workpiece receiving space is defined between the first rail, the second rail, and the non-ferromagnetic plate.

21. The drill press of claim 20, wherein the first rail and the second rail are configured to support the magnetic base on a round workpiece, and wherein a portion of the round workpiece is received within the workpiece receiving space.

22. The drill press of claim 17, wherein the chamfers of the respective first and second rails are engageable with a round workpiece.

23. The drill press of claim 17, wherein the ferromagnetic body includes a rib interconnecting the first rail and the second rail, and wherein the coil surrounds the rib, and wherein the rib is located between the flat bottom surface and a top surface of each of the first rail and second rail, and wherein each of the first rail and the second rail are ferromagnetic from the top surface to the bottom surface.

24. The drill press of claim 17, wherein the ferromagnetic body is H-shaped.

* * * * *